US009551784B2

(12) United States Patent
Katuri et al.

(10) Patent No.: US 9,551,784 B2
(45) Date of Patent: Jan. 24, 2017

(54) INTRUSION DETECTION (75) Inventors: SrinivasaRao Katuri, Bangalore (IN); Steve Huseth, Plymouth, MN (US); Amit Kulkarni, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1006 days.

(21) Appl. No.: 13/603,118

(22) Filed: Sep. 4, 2012

(65) Prior Publication Data
US 2014/0063257 A1 Mar. 6, 2014

(51) Int. Cl.
H04N 7/18 (2006.01)
G01S 13/00 (2006.01)
G01S 13/32 (2006.01)
G08B 13/16 (2006.01)
G01S 13/42 (2006.01)
G01S 13/58 (2006.01)

(52) U.S. Cl.
CPC ............ *G01S 13/003* (2013.01); *G01S 13/325* (2013.01); *G08B 13/1627* (2013.01); *G01S 13/42* (2013.01); *G01S 13/589* (2013.01)

(58) Field of Classification Search
CPC .............. H04N 7/188; G08B 13/19602; G08B 13/19695; G08B 13/19697; G06K 9/00771
USPC .......................................................... 348/152
See application file for complete search history.

(56) References Cited

U.S. PATENT DOCUMENTS 4,952,939 A   8/1990 Seed
7,262,729 B1  8/2007 Hershey et al.
2010/0026490 A1   2/2010 Butler et al.
2010/0256940 A1*  10/2010 Ogawa .................. G01S 7/4812 702/97
2012/0249356 A1*  10/2012 Shope ..................... G01S 13/04 342/22
2013/0003786 A1*  1/2013 Kim ..................... H04B 1/7073 375/149

FOREIGN PATENT DOCUMENTS

EP    0893703    * 6/1998    ............ G01S 13/00
EP    0893703      5/2002
IT    EP0893703   * 6/1998    ............ G01S 13/00

OTHER PUBLICATIONS

Kay Soon Low, et al. "Wireless Sensor Networks for Industrial Environments", IEEE Computer Society; 2006 International Conference on Intelligence For Modelling, Control and Automation. Jointly with International Conference on Intelligent Agents, Web Technologies and Internet Commerce, Nov. 30, 2005 (Nov. 30, 2005), pp. 1-6, XP002716589, Los Alamitos, CA,USA ISBN 0-7695-2504-0 Retrieved from the Internet: URL: http//ieeexplore.ieee.org/stamp/stamp.jsp?tp=arnumber=1631480 on Nov. 20, 2013.

* cited by examiner

Primary Examiner — William C Vaughn, Jr.
Assistant Examiner — Daniel Tekle
(74) Attorney, Agent, or Firm — Brooks, Cameron & Huebsch, PLLC (57) ABSTRACT

Systems, methods, and devices for an intrusion detection system are described herein. For example, one or more embodiments include transmitting a DSSS signal, receiving a reflected DSSS signal from a target, correlating the reflected DSSS signal and the transmitted DSSS signal, and determining a distance to the target based on the correlation between the reflected DSSS signal and the transmitted DSSS signal.

20 Claims, 4 Drawing Sheets

Fig. 3

INTRUSION DETECTION

TECHNICAL FIELD

The present disclosure relates to intrusion detection.

BACKGROUND

Areas can be maintained to provide for security and/or safety of the area (e.g., airports, businesses). For example, a fence, a surveillance system, and/or motion detectors can be installed. While a fence can help with preventing physical entry into the area, activities within the area can still be monitored by an individual from a vantage point outside the fence.

A surveillance system that utilizes a camera can be used to monitor a perimeter of the area. However, a field of view of the camera can be small compared to a size of the area and/or perimeter and an individual trying to gain unauthorized access to the area can be concealed by a non-line of sight condition (e.g., foliage, debris), for example.

Alternatively, and/or in addition, a motion detector can be used to detect an individual trying to gain access to the area. However, the individual can be concealed by a non-line of site condition, which can prevent the motion detector from detecting the individual.

DETAILED DESCRIPTION

Systems, methods, and devices for an intrusion detection system are described herein. For example, one or more embodiments include transmitting a direct sequence spread spectrum (DSSS) signal, receiving a reflected DSSS signal from a target, correlating the reflected DSSS signal and the transmitted DSSS signal, and determining a distance to the target based on the correlation between the reflected DSSS signal and the transmitted DSSS signal.

Security and/or safety of a particular area can be maintained through use of a variety of technologies. Infra-red and/or ultrasonic sensor technologies can be used to maintain the security and/or safety of an area. However, these technologies can require a line of sight between a sensor and a target for an accurate detection of the target. For example, if an obstruction, such as foliage and/or debris is located between the sensor and the target, the foliage and/or debris can obstruct the line of sight between the sensor and target, which can prevent an accurate detection of the target.

Alternatively, and/or in addition, video surveillance technologies can be used to maintain the security and/or safety of an area. However, video surveillance technologies can also require a line of sight between the camera and the target for an accurate detection of the target.

Some embodiments of the present disclosure can provide for an intrusion detection system that can operate in a non-line of sight condition. For example, some embodiments can use a transmitter that transmits a DSSS signal of a particular frequency, which can penetrate foliage and/or debris that can obstruct a line of sight between the sensor and the target, enabling detection of the target.

Alternatively, and/or in addition, some embodiments can provide for an outward looking capability for detecting a target. For example, some embodiments can detect a target, which is located in a position other than in between a transmitter and receiver. As such, a target can be detected in advance of crossing between the transmitter and receiver, providing additional time to alert security personal.

Alternatively, and/or in addition, some embodiments can use a multi-antenna receiver that can be used to receive the reflection of the transmitted DSSS signal off of the target. In an example, the reflected DSSS signal can be scattered as a result of reflecting off of foliage and/or debris. Use of the multi-antenna receiver can allow for an accurate determination of a position of the target.

Some embodiments of the present disclosure can determine a position of the target based on a phase delay between a DSSS signal that is transmitted and a reflected DSSS signal that is received from the target. In an example, a time delay between the transmitted DSSS signal and the reflected DSSS signal that is received can be calculated and used in determination of the position of the target.

Some embodiments of the present disclosure can determine a speed of the target based on the phase delay between the DSSS signal that is transmitted and a reflected DSSS signal that is received. Alternatively, and/or in addition a direction that the target is traveling can be determined.

Some embodiments of the present disclosure can include determining a size of the target based on an amplitude signature of the reflected DSSS signal and a radial extent of the target. In an example, the size of the target and the speed of the target can be used to classify a type of the target.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1A, and a similar element may be referenced as 310 in FIG. 3.

As will be appreciated, elements shown in the various embodiments herein can be added, exchanged, and/or eliminated so as to provide a number of additional embodiments of the present disclosure. As used herein, "a number of" refers to one or more. In addition, as will be appreciated, the proportion and the relative scale of the elements provided in the figures are intended to illustrate the embodiments of the present invention, and should not be taken in a limiting sense.

Figure 1A:
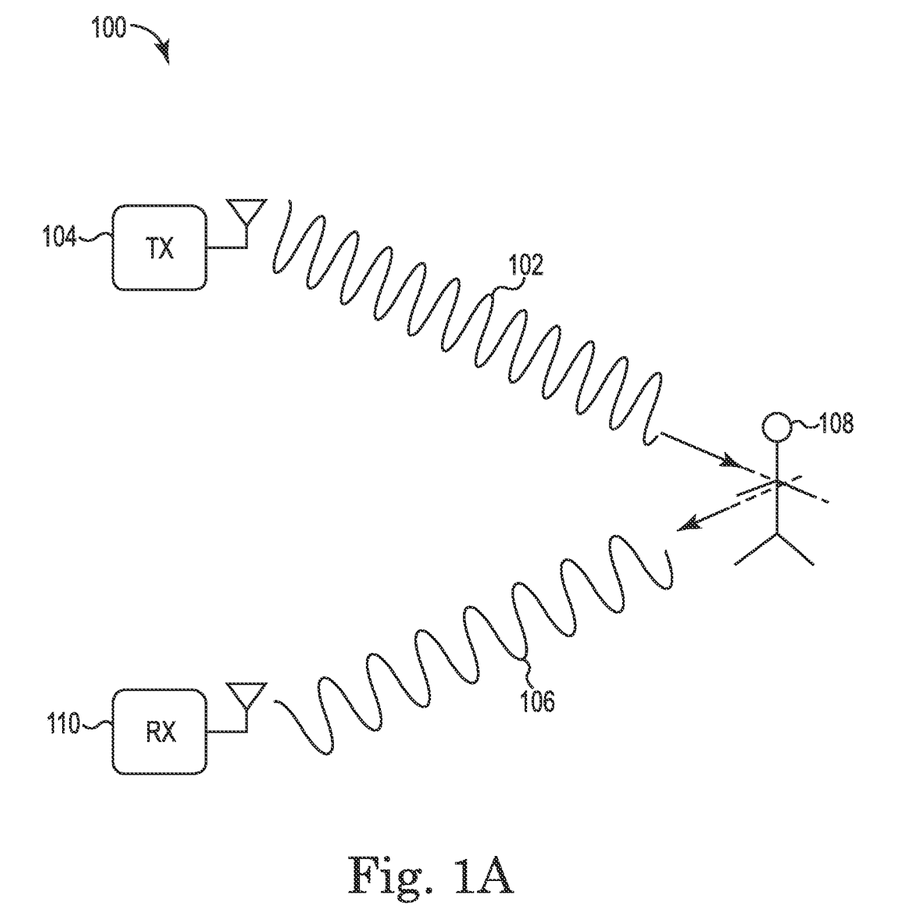
FIGS. 1A-B illustrate a system for intrusion detection according to one or more embodiments of the present disclosure.
Figure 1B:
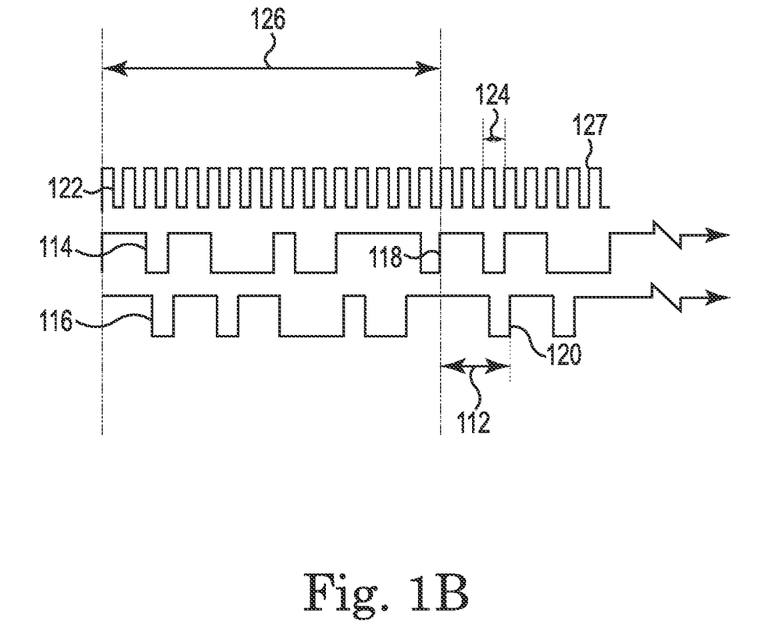

FIGS. 1A-B illustrates a system for intrusion detection according to one or more embodiments of the present disclosure. As shown in FIG. 1A, a DSSS signal 102 can be transmitted. In some embodiments, the transmitted DSSS signal 102 can be a pseudo-noise code-modulated signal. The pseudo-noise code-modulated signal can be modulated in frequency according to a code. In an example, the code can be binary (e.g., consisting of 1's and 0's).

The DSSS signal 102 can be transmitted by a transmitter 104, in an example. As used herein, the DSSS signal 102 can be defined as a radio frequency communications signal in which the signal bandwidth is spread over a larger bandwidth by injecting a higher frequency signal. The DSSS signal 102 can be transmitted at a frequency in the Industrial, Scientific, and Medical (ISM) bands. These bands can allow for unlicensed electromagnetic radiation across a number of wide spectrum bands. In an example, the DSSS signal 102 can be transmitted at a frequency of at least one of 900 megahertz, 2.4 gigahertz, and/or 5.8 gigahertz.

The DSSS signal 102 can reflect off of a target 108 to form a reflected DSSS signal 106. In an example, the target can be an individual, animal, and/or vehicle, for example. The target can be concealed by vegetation and/or debris, such that a non-line of sight condition exists.

Upon reflection of the DSSS signal 102, the reflected DSSS signal 106 can undergo a phase delay versus the DSSS signal 102. For example, the phase of the reflected DSSS signal 106 can be delayed by a particular time as a result of the reflection of the DSSS signal off of the target 108.

In some embodiments, the reflected DSSS signal 106 can be received from the target 108. In an example, the reflected DSSS signal 106 can be received by a receiver 110.

The transmitter 104 and the receiver 110 can be located at the same point and/or can be located at different points. When the transmitter 104 and the receiver 110 are located at the same point, the DSSS signal can be transmitted and received at the same point. When the transmitter 104 and the receiver 110 are at different points, the DSSS signal can be transmitted at a first point and received at a second point.

In some embodiments, the DSSS signal can be transmitted by the transmitter 104 in a direction away from the receiver 110, as shown in FIG. 1A. As such, the system 100 differs from a radio frequency curtain. In an example, a radio frequency curtain can be created between a transmitter-receiver pair by a transmitter transmitting a radio frequency toward a receiver. A target can be detected when the target passes between the transmitter-receiver pair and breaks the radio frequency curtain. However, because the radio frequency curtain only exists between the transmitter and receiver, minimal time can be provided for alerting security personal.

In contrast, some embodiments of the present disclosure can provide a system for intrusion detection that provides an outward looking capability for detection of a target. For example, as discussed herein, the transmitter 104 can transmit the DSSS signal in a direction away from the receiver 110. By transmitting a DSSS signal in a direction away from the receiver 110, the system 100 can detect more than a target between the transmitter 104 and receiver 110. For instance, the outward looking capability of the system 100 can detect target 108, which is not between the transmitter 104 and the receiver 110.

In some embodiments, a replica of the transmitted DSSS signal can be generated. In an example, information can be sent from the receiver 104 to the transmitter 110 for replication of the transmitted DSSS signal. For instance, the receiver can receive the code used for the pseudo-noise code-modulated signal. In an example, the receiver can generate a replica of the transmitted DSSS signal using the code.

In some embodiments, an azimuth of the reflected DSSS signal 106 can be determined. The azimuth of the reflected DSSS signal 106 can be defined as the angle at which the receiver 110 receives the reflected DSSS signal 106. In an example, depending on where the target 108 is located, the DSSS signal 102 can be reflected off of the target 108 differently. As a result, the reflected DSSS signal can be received at a different angle, resulting in an azimuth of the reflected DSSS signal that can change.

As shown in FIG. 1B, a phase delay 112 between the replica of the transmitted DSSS signal and the reflection of the DSSS signal can be determined. In an example, the code used to modulate the transmitted DSSS signal, hereinafter referred to as transmitted code 114, can be used to determine the phase delay of the DSSS signal, since a phase of the code can correspond to a phase of the DSSS signal. Alternatively, and/or in addition, a replica of the transmitted code can be used to determine the phase delay of the DSSS signal.

For instance, the transmitted code 114 and/or replica of the transmitted code can be sent to the receiver and a reflection of the code used to modulate the transmitted DSSS signal, hereinafter referred to as reflected code 116, can be received by the receiver from the target 108. The reflected code 116 can have a phase delay relative to the transmitted code 114. This can be a result of the transmitted code 114, contained in the DSSS signal 102, reflecting off of the target 108.

The phase delay can be defined as a delay in phase between a first phase 118 of the transmitted code 114 and a second phase 120 of the reflected code 120 corresponding to the first phase 118 of the transmitted code 116. For instance, the second phase 120 corresponding to the first phase 118 can be delayed by a phase delay 112, relative to the first phase 118, as a result of the DSSS signal 102 reflecting off of the target 108, as illustrated in FIG. 1A.

In an example, the phase delay 112 can be derived by computing an autocorrelation function for the reflected code 120 and a number of shifted versions of the transmitted code 114 until a shift is found for which the transmitted code 114 and the reflected code 116 correlate. Upon correlation of the transmitted code 114 and the reflected code 116, the phase delay 112 between the first phase 118 of the transmitted code 114 and the second phase 120 corresponding to the first phase 120 of the transmitted code 116 can be determined.

In an example, a chipping sequence 122 can be correlated with the transmitted code 114 and the reflected code 116. The chipping sequence 122 can include a number of chips 127 that form the chipping sequence 122. A chip length 124, which can be defined as a time between each of the number of chips 127, can be used to determine a time corresponding to the phase delay 112.

Upon determination of the phase delay 112 and azimuth of the reflected DSSS signal 106, a position of the target 108 can be determined. For example, a distance to the target 108 from a point where the DSSS signal is received can be determined, which can be combined with the azimuth of the reflected DSSS signal 106 to determine the position of the target 108.

In an example, the distance to the target 108 can be determined through the equation:

$$D = \frac{c * \tau}{2}$$

where D represents the distance to the target 108, c represents the speed of light, and τ represents a propagation delay of the transmitted code 114. For instance, the distance to the target 108 can be determined as a function of the speed of light and the propagation delay.

In an example, τ can represent a total time for the DSSS signal to transmit from the transmitter 104 to the target 108 and receive at the receiver 110 from the target 108. For example, τ can be represented by the equation:

$$\tau = R_{tx} + R_{rx}$$

where τ is the propagation delay, $R_{tx}$ is the time for the DSSS signal 102 to transmit from the transmitter 104 to the target 108 and $R_{rx}$ is the time for the reflected DSSS signal 106 to transmit from the target 108 and receive at the receiver 110. The propagation delay can be determined through the equation:

$$\tau = \frac{(\Delta\varphi * T)}{360°}$$

where τ is the propagation delay, Δφ is the phase delay 112 and T is a period of the transmitted code 126. For instance, the propagation delay of the transmitted DSSS signal can be determined as a function of the phase delay 112 and the period of the transmitted code, which can be equivalent to a period of the transmitted DSSS signal.

Figure 2:
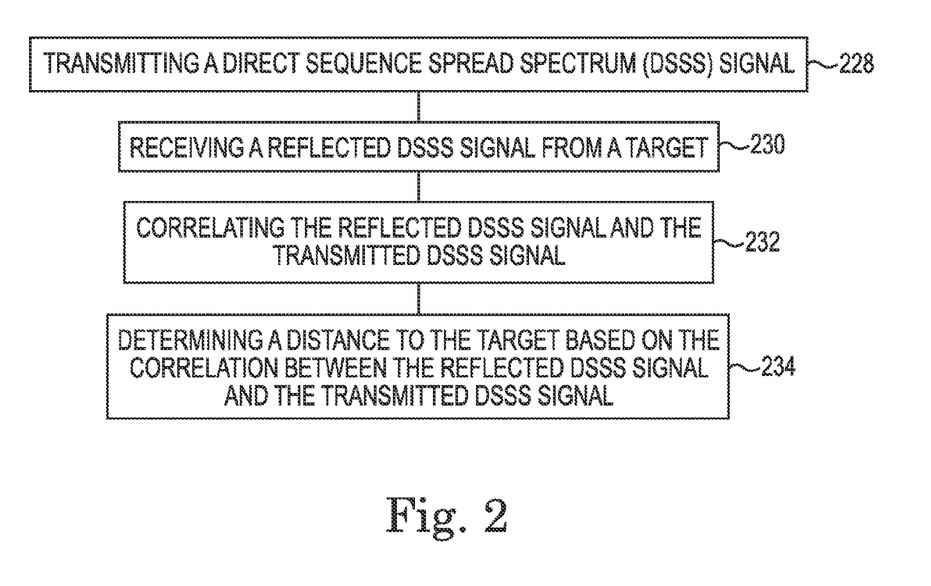
FIG. 2 illustrates a method for intrusion detection according to one or more embodiments of the present disclosure.

FIG. 2 illustrates a method for intrusion detection according to one or more embodiments of the present disclosure. At block 228, the method can include transmitting a DSSS signal. As discussed herein, the transmitted DSSS signal can be a pseudo-noise code-modulated signal. The pseudo-noise code-modulated signal can be modulated in frequency according to a code. The method can include receiving a reflected DSSS signal from a target, at block 230. For instance, the DSSS signal can be reflected off of the target and received.

In some embodiments, the DSSS signal can be transmitted with a transmitter and the reflected DSSS signal can be received with a receiver. In an example, the transmitter and receiver can be in communication with one another. For instance, information associated with the code used to modulate the transmitted DSSS signal can be sent by the transmitter to the receiver.

In some embodiments, the method can include correlating the reflected DSSS signal and the transmitted DSSS signal. Alternatively, and/or in addition, the code used to modulate the transmitted DSSS signal, which can correspond with the transmitted DSSS signal, can be correlated with a reflection of the code used to modulate the transmitted DSSS signal, which can correspond with the reflected DSSS signal.

In some embodiments, a replica of the code used to modulate the frequency of the transmitted DSSS signal can be generated. In an example, the replica of the code used to modulate the frequency of the transmitted DSSS signal can be generated with the receiver. For instance, the information associated with the code used to modulate the transmitted DSSS signal can be sent by the transmitter to the receiver and used by the receiver to generate the replica of the code used to modulate the frequency of the transmitted DSSS signal.

In an example, a chipping sequence can be correlated between a reflection of the code used to modulate the frequency of the transmitted DSSS signal and the replica of the code used to modulate the frequency of the transmitted DSSS signal. As a result of the transmitted DSSS signal reflecting off of the target, a phase delay can occur. For instance, a phase delay can occur in the reflection of the reflected DSSS signal and the associated reflection of the code used to modulate the frequency of the transmitted DSSS signal.

As discussed herein, the reflected DSSS signal and the transmitted DSSS signal can be correlated by computing an autocorrelation function for the reflection of the code used to modulate the frequency of the transmitted DSSS signal and a number of shifted versions of the code used to modulate the frequency of the transmitted DSSS signal until a shift is found between the codes. The chipping sequence can then be used to determine a phase delay based on the correlation of the chipping sequence between the reflection of the code used to modulate the frequency of the transmitted DSSS signal and the replica of the code used to modulate the frequency of the transmitted DSSS signal.

The method can include calculating a time delay between the transmitted DSSS signal and the reflected DSSS signal based on the phase delay between the transmitted DSSS signal and the reflected DSSS signal. As discussed herein, the chipping sequence can include a number of chips that form the chipping sequence. A chip length, which can be defined as a time between each of the number of chips can be used to determine a time corresponding to the phase delay. As such, the chip length can be determined for the phase delay, and a time associated with the chip length of the phase delay can be determined.

The method can include, at block 340, determining a distance to the target based on the correlation between the reflected DSSS signal and the transmitted DSSS signal. In an example, the distance to the target can be determined based on the phase delay between the reflected DSSS signal and the transmitted DSSS signal. As discussed herein, the phase delay can be determined based on the correlation of the chipping sequence between the reflection of the code used to modulate the frequency of the transmitted DSSS signal and the replica of the code used to modulate the frequency of the transmitted DSSS signal.

In some embodiments, the method can include determining an azimuth of the reflected DSSS signal. As discussed herein, the azimuth of the reflected DSSS signal can be defined as the angle at which the receiver receives the reflected DSSS signal. In an example, a distance to the target can be determined; however, a position of the target can remained undetermined if a direction is not associated with the distance to the target.

In an example, since the reflected DSSS signal is reflected off of the target and received by the receiver, the position of the target can be determined to be along a path that the reflected DSSS signal traveled from the target to the receiver. As such, the azimuth of the reflected DSSS signal can be determined and combined with the distance to the target to determine the position of the target.

In some embodiments, a speed of the target can be determined based on the azimuth of the reflected DSSS signal and the distance to the target. For example, as discussed herein, the position of the target can be determined based on the azimuth and the distance to the target. As such, a first position of the target at a first time can be determined and a second position of the target at a second time can be determined.

A distance can be determined between the first position and the second position as well as a difference in time between the first time and the second time. Based on the distance between the first position and the second position and the difference in time between the first time and the second time, the speed of the target can be determined. Alternatively, and/or in addition, a direction that the target is traveling can be determined.

In some embodiments, the method can include receiving the reflected DSSS signal from the target at a multi-antenna receiver. In an example, the reflected DSSS signal can be scattered upon reflection off of the target and/or vegetation and/or debris located between the target and the receiver. As such, a single antenna can have difficulty determining an angle of arrival of a scattered signal, which can lead to difficulty in determining an azimuth of the target and/or a phase delay between the transmitted DSSS signal and the reflected DSSS signal, for example.

In an example, receiving the reflected DSSS signal with the multi-antenna receiver can improve an accuracy at which the azimuth of the target is determined. For example, the reflected DSSS signal received at each of the multiple antennas can be compared. Upon comparison of the reflected DSSS signal received at each of the multiple antennas, reflected DSSS signals with corresponding properties can be grouped.

For instance, reflected DSSS signals with azimuths, wavelengths, and/or amplitudes that are similar can be determined. Based on the comparison of the reflected DSSS signals, a determination of which reflected DSSS signal to use for determining properties associated with the DSSS signal can be made. For instance, DSSS signals received by each of the multiple antennas that share a similar and/or same azimuth, wavelength, and/or amplitude can be used to determine properties associated with the DSSS signal and/or used for determination of phase delay, for example.

In an example, DSSS signals received by each of the multiple antennas that share the similar and/or same azimuth, wavelength, and/or amplitude can be used for the determination of the azimuth. In an example, the reflected DSSS signal can reflect off of vegetation and/or debris, causing DSSS signals of various azimuths to be received by the antenna. As such, a DSSS signal that may be received by one antenna and not another antenna can be neglected.

Alternatively, and/or in addition, a DSSS signal reflected off of the target can arrive at each of the multiple antennas with the same azimuth. Accordingly, based on the comparison of the reflected DSSS signal received at each of the multiple antennas, a determination of the azimuth of the DSSS signal reflected off of the target can be made.

In some embodiments, a position of the target can be determined based on the azimuth of the reflected DSSS signal and the distance to the target. As discussed herein, the azimuth of the reflected DSSS signal can be determined and combined with the distance to the target to determine the location of the target.

In some embodiments, a notification can be sent to an imaging device. In an example, the notification can include the position of the target. Alternatively, and/or in addition, the notification can include an azimuth, position, and/or size of the target. Size of the target can be determined as discussed herein. For instance, the notification can be sent to a video camera, still camera, and/or controller of a video camera and/or still camera. Upon receipt of the notification, the imaging device can be adjusted to focus on the target and/or record the target, based on the position of the target.

In some embodiments, the size of the target can be sent to the camera, so the camera can zoom in and/or zoom out to acquire an adequately sized image of the target. For example, if the target is large, the camera can zoom out and if the target is small, the camera can zoom in an appropriate amount such that an image with adequate details can be obtained for identification of the target manually and/or through facial recognition software.

In some embodiments, the method can include determining a size of the target based on an amplitude signature of the reflected DSSS signal and a radial extent of the target. As used herein, radial extent of a target can be defined as a dimension of the target measured as the transmitted DSSS signal propagates radially outward after reflecting from the target.

In some embodiments, the method can include determining a type of target based on the size of the target and the speed of the target. For example, if the size of the target is small and the speed of the target is slow, the target can be determined to be a small target. Alternatively, and/or in addition, if the size of the target is large and the speed of the target is fast, the target can be determined to be a large target.

In an example, targets can be assigned a priority for identification based on the determination of the type of target they are. For instance, a target that is determined to be a small target (e.g., small in size and slow in speed) can be assigned a low priority for recording with the imaging device and/or identification. Alternatively, and/or in addition, a target that is determined to be a large target can be assigned a high priority for recording with the imaging device and/or identification.

Figure 3:
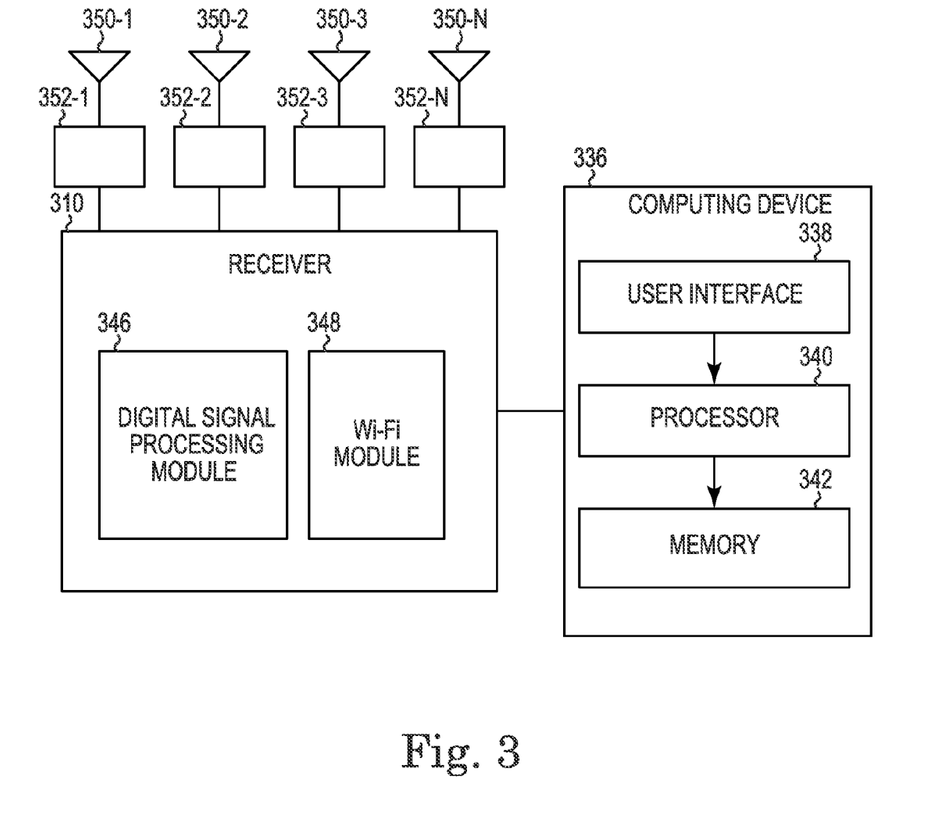
FIG. 3 illustrates a computing device for intrusion detection according to one or more embodiments of the present disclosure.

FIG. 3 illustrates a computing device and a receiver for intrusion detection according to one or more embodiments of the present disclosure. Computing device 336 can be used to perform the method as discussed in relation to FIG. 2. As shown in FIG. 3, computing device 336 includes a user interface 338. User interface 338 can be a graphic user interface (GUI) that can provide (e.g., display and/or present) and/or receive information (e.g., data and/or images) to and/or from a user (e.g., operator) of computing device 336. For example, user interface 338 can include a screen that can provide information to a user of computing device 336 and/or receive information entered into a display on the screen by the user. However, embodiments of the present disclosure are not limited to a particular type of user interface.

As shown in FIG. 3, computing device 336 includes a processor 340 and a memory 342 coupled to the processor 340. Memory 342 can be volatile or nonvolatile memory. Memory 342 can also be removable (e.g., portable) memory, or non-removable (e.g., internal) memory. For example, memory 342 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 342 is illustrated as being located in computing device 336, embodiments of the present disclosure are not so limited. For example, memory 342 can also be located internal to another computing resource (e.g., enabling computer readable instructions to be downloaded over the Internet or another wired or wireless connection). Memory 342 can also store executable instructions, such as, for example, computer readable instructions (e.g., software), for operation of the thermal comfort system according to one or more embodiments of the present disclosure.

Processor 340 can execute the executable instructions stored in memory 342 in accordance with one or more embodiments of the present disclosure. For example, processor 340 can execute the executable instructions stored in memory 342 to transmit a first DSSS signal from a first point and a second DSSS signal from a second point. For example, the first DSSS signal can be transmitted from a first transmitter at the first point and the second DSSS signal can be transmitted from a second transmitter at a second point.

In some embodiments, the first DSSS signal and/or the second DSSS signal can be transmitted at a frequency in the industrial, scientific, and medical (ISM) radio bands. The ISM bands can be reserved for the use of radio frequency energy for ISM purposes other than communications. In an example, the first DSSS signal and/or the second DSSS signal can be transmitted at a frequency of at least one of 900 megahertz, 2.4 gigahertz, and/or 5.8 gigahertz.

In some embodiments, processor 340 can execute the executable instructions stored in memory 342 to receive a reflection of the first DSSS signal from a target at the first point and a reflection of the second DSSS signal from the target at the second point. In an example, the reflection of the first DSSS signal can be received at the first point with a first receiver and the reflection of the second DSSS signal can be received at the second point with a second receiver.

As shown in FIG. 3, a receiver 310 can include a digital signal processing module 346. As discussed herein, the digital signal processing module 346 can be used for detecting the target, determining a position of the target, a speed of the target, size of the target, and/or a type of target. Alternatively, and/or in addition, the digital signal processing module 346 can assign a priority for identification based on a determination of the type of target, as discussed herein.

The receiver can include a Wi-Fi module 348, which can transmit instructions to a controller of an imaging device and/or imaging device wirelessly. For example, upon detection of a target, instructions can be sent to a camera controller to record the target, as discussed herein.

The receiver can include multiple antennas 350-1, 350-2, 350-3, 350-N. In an example, the multiple antennas can receive the reflection of the DSSS signal. As discussed herein, the reflected DSSS signal can be reflected off of vegetation and/or debris, which can cause the signal to scatter, which can make it difficult to identify the DSSS signal reflected from the target. By receiving DSSS signals that have been scattered with multiple antennas, the DSSS signals can be compared and a determination can be made of which DSSS signal was reflected off of the target. As such, the reflected DSSS signal can be used for determining properties of the target.

The receiver can include multiple converters 352-1, 352-2, 352-3, 352-N. Upon reception of the reflected DSSS signal at the antennas 350-1, 350-2, 350-3, 350-N, the converters 352-1, 352-2, 352-3, 352-N can convert the reflected DSSS signal to a reflection of a code used to modulate the transmitted DSSS signal, as discussed herein.

In some embodiments, processor 340 can execute the executable instructions stored in memory 342 to determine a first phase delay between the reflection of the first DSSS signal and the first transmitted DSSS signal and a second phase delay between the reflection of the second DSSS signal and the second transmitted DSSS signal. As discussed herein, the reflection of the code used to modulate the transmitted DSSS signal can be used to determine the phase delay.

In some embodiments, processor 340 can execute the executable instructions stored in memory 342 to determine a position of the target based on the first and second phase delay and a distance between the first and second point. In an example, a distance from the first point to the target can be determined from the first phase delay, as discussed herein and a distance from the second point to the target can be determined from the second phase delay.

Accordingly, the position of the target can be found based on the distance to the target from the first point, the distance to the target from the second point, and the distance between the first and second point. In an example, a triangle can be formed by the distance to the target from the first point, the distance to the target from the second point, and the distance between the first and second point. As such, an azimuth of the target can be determined in relation to the first and/or second point, for example.

In some embodiments, processor 340 can execute the executable instructions stored in memory 342 to store the position of the target at a first time and a second time. In an example, a speed of the target can be determined based on the position of the target at the first time and the position of the target at the second time, as discussed herein.

In some embodiments, processor 340 can execute the executable instructions stored in memory 342 to display the position of the target on the user interface 338. In an example, statistics associated with the target can be displayed on the user interface 338. For instance, the size of the target, the speed of the target, and/or classification of the type of target can be displayed on the user interface 338.

Alternatively, and/or in addition, a map can be displayed on the user interface 338 and the target can be displayed on the map. For example, the map can include a depiction of an area for which the system 100 is providing intrusion detection.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

What is claimed:

1. A method for intrusion detection, comprising:
   transmitting a direct sequence spread spectrum (DSSS) signal, wherein the signal includes a chipping sequence formed from multiple chips and wherein a chip length is a time between each of the chips and the chip length determines a time period corresponding to a phase delay;
   receiving a reflected DSSS signal from a target, via a receiver;
   determining the phase delay by correlating the reflected DSSS signal and the transmitted DSSS signal based upon comparison of the chipping sequences of the reflected DSSS signal and the transmitted DSSS signal;
   determining a distance to the target based on the phase delay between the reflected DSSS signal and the transmitted DSSS signal; and determining a location of the target based on an azimuth of the reflected DSSS signal and the distance to the target, wherein the azimuth of the reflected DSSS signal is an angle at which the receiver receives the reflected DSSS signal.

2. The method of claim 1, wherein the method includes:
generating a replica of a code used to modulate a frequency of the transmitted DSSS signal; and
correlating the chipping sequence between a reflection of the code used to modulate the frequency of the transmitted DSSS signal and the replica of the code used to modulate the frequency of the transmitted DSSS signal.

3. The method of claim 2, wherein the method includes:
transmitting the DSSS signal with a transmitter;
receiving the reflected DSSS signal with the receiver; and
generating the replica of the code used to modulate the frequency of the transmitted DSSS signal with the receiver.

4. The method of claim 2, wherein the method includes determining the phase delay based on the correlation of the chipping sequence between the reflection of the code used to modulate the frequency of the transmitted DSSS signal and the replica of the code used to modulate the frequency of the transmitted DSSS signal.

5. The method of claim 4, wherein the method includes calculating a time delay between the transmitted DSSS signal and the reflected DSSS signal based on the phase delay between the transmitted DSSS signal and the reflected DSSS signal.

6. The method of claim 1, wherein the method includes:
determining the azimuth of the reflected DSSS signal; and
determining a speed of the target based on the azimuth of the reflected DSSS signal and the distance to the target.

7. The method of claim 6, wherein the method includes:
receiving the reflected DSSS signal from the target at a multi-antenna receiver;
comparing the reflected DSSS signal received at each of the multiple antennas; and
determining the azimuth of the reflected DSSS signal from the comparison of the reflected DSSS signals.

8. The method of claim 1, wherein the method includes:
determining a position of the target based on the azimuth of the reflected DSSS signal and the distance to the target;
sending a notification to an imaging device, wherein the notification includes the position of the target; and
recording the target with the imaging device, based on the position of the target.

9. The method of claim 1, wherein the method includes determining a size of the target based on an amplitude signature of the reflected DSSS signal and a radial extent of the reflected DSSS signal.

10. The method of claim 1, wherein the method includes determining a type of target based on the size of the target and the speed of the target.

11. A machine-readable non-transitory medium storing instructions for intrusion detection, the instructions executable by a machine to cause the machine to:
transmit a first direct sequence spread spectrum (DSSS) signal from a first point and a second DSSS signal from a second point, wherein each of the first DSSS signal and the second DSSS signal include a chipping sequence formed from multiple chips and wherein a chip length is a time between each of the chips and the chip length determines a first time period corresponding to a first phase delay and a second time period corresponding to a second phase delay;
receive a reflection of the first DSSS signal from a target at the first point and a reflection of the second DSSS signal from the target at the second point;
determine the first phase delay between the reflection of the first DSSS signal and the first transmitted DSSS signal based upon comparison of the chipping sequences of the reflected first DSSS signal and the transmitted first DSSS signal and the second phase delay between the reflection of the second DSSS signal and the second transmitted DSSS signal based upon comparison of the chipping sequences of the reflected second DSSS signal and the transmitted second DSSS signal;
determine a position of the target based on the first and second phase delay and a distance between the first and second point; and
determine an azimuth of the target based on the first and second point.

12. The medium of claim 11, wherein the instructions are executable by the machine to store the position of the target at a first time and a second time.

13. The medium of claim 11, wherein the instructions are executable by the machine to determine a speed of the target based on the position of the target at the first time and the position of the target at the second time.

14. The medium of claim 11, wherein the instructions are executable by the machine to display the position of the target on a user interface.

15. The medium of claim 11, wherein the instructions are executable by the machine to transmit the first DSSS signal and the second DSSS signal at an industrial, scientific, and medical radio band.

16. A system for intrusion detection, the system comprising a processing resource in communication with a non-transitory computer-readable medium, wherein the computer-readable medium contains a set of instructions and wherein the processing resource is designed to execute the set of instructions to:
transmit a direct sequence spread spectrum (DSSS) signal with a transmitter, wherein the signal includes a chipping sequence formed from multiple chips and wherein a chip length is a time between each of the chips and the chip length determines a time corresponding to a phase delay;
receive a reflected DSSS signal from a target with a receiver;
generate a replica of the transmitted DSSS signal;
determine the phase delay between the replica of the transmitted DSSS signal and the reflected DSSS signal based upon comparison of the chipping sequences of the reflected DSSS signal and the replica of the transmitted DSSS signal, and an azimuth of the reflected DSSS signal; and
determine a position of the target based on the phase delay and the azimuth of the reflected DSSS signal, wherein the azimuth of the reflected DSSS signal is an angle at which the receiver receives the reflected DSSS signal.

17. The system of claim 16, wherein the instructions are executable to determine a distance to the target from a point where the DSSS signal is received.

18. The system of claim 16, wherein the DSSS signal is transmitted by the transmitter in a direction away from the receiver.

19. The system of claim 16, wherein the instructions are executable to determine a propagation delay of the transmitted DSSS signal as a function of the phase delay and a period of the transmitted DSSS signal.

20. The system of claim 19, wherein the instructions are executable to determine the distance to the target as a function of the speed of light and the propagation delay.

\* \* \* \* \*